(12) United States Patent
Kojima

(10) Patent No.: US 11,380,121 B2
(45) Date of Patent: Jul. 5, 2022

(54) FULL SKELETAL 3D POSE RECOVERY FROM MONOCULAR CAMERA

(71) Applicant: SONY CORPORATION, Tokyo (JP)

(72) Inventor: Tamaki Kojima, Sunnyvale, CA (US)

(73) Assignee: Sony Group Corporation, Tokyo (JP)

( * ) Notice: Subject to any disclaimer, the term of this patent is extended or adjusted under 35 U.S.C. 154(b) by 182 days.

(21) Appl. No.: 17/002,015

(22) Filed: Aug. 25, 2020

(65) Prior Publication Data

US 2022/0067357 A1 Mar. 3, 2022

(51) Int. Cl.
| | |
|---|---|
| *G06T 7/73* | (2017.01) |
| *G06T 7/60* | (2017.01) |
| *G06V 40/10* | (2022.01) |

(52) U.S. Cl.
CPC ............. *G06V 40/10* (2022.01); *G06T 7/60* (2013.01); *G06T 7/73* (2017.01); *G06T 2207/10016* (2013.01); *G06T 2207/30196* (2013.01)

(58) Field of Classification Search
CPC .. G06V 40/10; G06T 7/73; G06T 7/60; G06T 2207/10016; G06T 2207/30196
See application file for complete search history.

(56) References Cited

U.S. PATENT DOCUMENTS

| 10,431,000 | B2 * | 10/2019 | Zhang ...................... G06T 7/251 |
| 2021/0064925 | A1 * | 3/2021 | Shih ...................... G06K 9/6256 |

FOREIGN PATENT DOCUMENTS

| CN | 109271933 A | 1/2019 |
| CN | 110751039 A | 2/2020 |

OTHER PUBLICATIONS

Xingyi Zhou, Qixing Huang, Xiao Sun, Xiangyang Xue, Yichen Wei; "Towards 3D Human Pose Estimation in the Wild: a Weakly-supervised Approach"; 2017 IEEE (Year: 2017).*
Nägeli, S Oberholzer, S Plüss, J Alonso-Mora, O Hilliges; Flycon: Real-time Environment-independent Multi-view Human Pose Estimation with Aerial Vehicles; ACM;Nov. 2018 (Year: 2018).*
Hao-Shu Fang, Yuanlu Xu, Wenguan Wang, Xiaobai Liu, Song-Chun Zhu; "Learning Pose Grammar to Encode Human Body Configuration for 3D Pose Estimation"; AAAI conference on artificial intelligence, 2018. (Year: 2018).*

(Continued)

*Primary Examiner* — Shaghayegh Azima
(74) *Attorney, Agent, or Firm* — Haverstock & Owens, A Law Corporation

(57) ABSTRACT

Recent progress of neural networks has shown significant progress over human pose estimation tasks. Pose estimation could be categorized into monocular 2D pose estimation, multi-view 3D pose estimation, and single view 3D pose estimation, where recently 3D pose is getting more attention to be applied to AR/VR, game and human computer interaction applications. However, current academic benchmarks on human 3D pose estimation only respect performance on their relative pose. The root positioning over the time, in another word, the "trajectory" of the whole body in 3D space is not considered well enough. Applications such as motion capture, not only require precise relative pose of the body but also the root position of the whole body in 3D space. Therefore, an efficient monocular full 3D pose recovery model from 2D pose input is described herein, which is able to be applied to the above applications.

21 Claims, 15 Drawing Sheets

(56) References Cited

OTHER PUBLICATIONS

Keze Wang et al., "3D Human Pose Machines With Self-Supervised Learning" IEEE Transactions on pattern analysis and machine intelligence, 2019, pp. 1-14. arXiv:19*01.03798v2 [cs.CV] Jan. 15, 2019.

Hao-Shu Fang et al., "Learning Pose Grammer to Encode Human Body Configuration for 3D Pose Estimation", Dept. Computer Science and Statistics, University of California, Los Angeles, Shanghai Jiao Tong University Beijing Institute of Technology, Dept. Computer Science, San Diego State University, arXiv:1710.06513v6 [cs.CV] Jan. 4, 2018.

\* cited by examiner

| Human3.6M | Method | VP3D | | Present Method | |
|---|---|---|---|---|---|
| | w/ KCS | | ✓ | | ✓ |
| | w/ LSTM | | ✓ | ✓ | ✓ |
| | Parameters [M] | 16.93 | 7.01 | 6.58 | 6.77 |
| 15 keypoints w/ augmentation | MPJPE [mm] | 54.59 | 48.33 | 53.17 | 48.14 |
| | MPE [mm] | - | 196.05 | 227.14 | 210.91 |
| 17 keypoints w/ augmentation | MPJPE [mm] | 55.37 | 46.74 | 52.52 | 48.61 |
| | MPE [mm] | - | 191.14 | 208.28 | 166.46 |

Fig. 11

| Human3.6M | Method | Present Method | |
|---|---|---|---|
| | w/ KCS | | ✓ |
| | w/ LSTM | ✓ | ✓ |
| | Parameters [M] | 7.01 | 6.77 |
| 15 keypoints w/ augmentation | MPE [mm] | 197.18 | 213.35 |
| | MTE [mm] | 4.12 | 5.28 |
| 17 keypoints w/ augmentation | MPE [mm] | 190.16 | 170.83 |
| | MTE [mm] | 4.00 | 6.27 |

Fig. 12

FULL SKELETAL 3D POSE RECOVERY FROM MONOCULAR CAMERA

FIELD OF THE INVENTION

The present invention relates to content estimation. More specifically, the present invention relates to 3D pose estimation.

BACKGROUND OF THE INVENTION

After the huge success of human 2D pose estimation, in order to expand its applications such as in movies, surveillance, and human-computer interaction, human 3D pose estimation has attracted a lot of attention. Many methods were proposed including multi-view methods, temporal methods, monocular 3D pose methods for skeletal and monocular 3D pose methods with 3D meshes.

SUMMARY OF THE INVENTION

Recent progress of neural networks has shown significant progress over human pose estimation tasks. Pose estimation could be categorized into monocular 2D pose estimation, multi-view 3D pose estimation, and single view 3D pose estimation, where recently 3D pose is getting more attention to be applied to AR/VR, game and human computer interaction applications. However, current academic benchmarks on human 3D pose estimation only respect performance on their relative pose. The root positioning over the time, in another word, the "trajectory" of the whole body in 3D space is not considered well enough. Applications such as motion capture, not only require precise relative pose of the body but also the root position of the whole body in 3D space. Therefore, an efficient monocular full 3D pose recovery model from 2D pose input is described herein, which is able to be applied to the above applications. Described herein is the network architecture combining temporal 1D convolution and Long Short Term Memory (LSTM) for root position estimation, how to formulate the outputs, design of loss functions and comparison with a state-of-the-art model to show effectiveness of the approach for application use. As described herein, 3D pose estimation on 15 and 17 keypoints is performed, but it could be extended to arbitrary keypoint definitions.

In one aspect, a method comprises receiving camera information, wherein the camera information includes a 2-dimensional pose and camera parameters including a focal length, applying feature extraction on the camera information, including residual determination with 1-dimensional convolution, estimating bone lengths based on the feature extraction, estimating bone unit vectors based on the feature extraction, conditioned on the bone lengths and estimating relative poses from the bone lengths and the bone unit vectors, and deriving root positions based on the feature extraction, conditioned on the bone lengths and the bone unit vectors. The method further comprises receiving one or more frames as input. Every bone length is assumed to not exceed 1 meter in length. Long short term memory is used for estimating the root position to stabilize the root position. The method further comprises applying automatic augmentation on a global position and rotation to simulate dynamic motions. The method further comprises randomly changing a camera field-of-view to each batch sample to estimate arbitrary videos with different camera parameters. The method further comprises performing perturbation of a 2-dimensional pose with Gaussian noise and random keypoint drop on 2-dimensional pose input to simulate the noise and occlusion situation of 2-dimensional pose predictions.

In another aspect, an apparatus comprises a non-transitory memory for storing an application, the application for: receiving camera information, wherein the camera information includes a 2-dimensional pose and camera parameters including a focal length, applying feature extraction on the camera information, including residual determination with 1-dimensional convolution, estimating bone lengths based on the feature extraction, estimating bone unit vectors based on the feature extraction, conditioned on the bone lengths and estimating relative poses from the bone lengths and the bone unit vectors, and deriving root positions based on the feature extraction, conditioned on the bone lengths and the bone unit vectors and a processor coupled to the memory, the processor configured for processing the application. The apparatus wherein the application is configured for receiving one or more frames as input. Every bone length is assumed to not exceed 1 meter in length. Long short term memory is used for estimating the root position to stabilize the root position. The application is configured for applying automatic augmentation on a global position and rotation to simulate dynamic motions. The application is configured for randomly changing a camera field-of-view to each batch sample to estimate arbitrary videos with different camera parameters. The application is configured for performing perturbation of a 2-dimensional pose with Gaussian noise and random keypoint drop on 2-dimensional pose input to simulate the noise and occlusion situation of 2-dimensional pose predictions.

In another aspect, a system comprises a camera configured for acquiring content and a computing device configured for: receiving camera information from the camera, wherein the camera information includes a 2-dimensional pose and camera parameters including a focal length, applying feature extraction on the camera information, including residual determination with 1-dimensional convolution, estimating bone lengths based on the feature extraction, estimating bone unit vectors based on the feature extraction, conditioned on the bone lengths and estimating relative poses from the bone lengths and the bone unit vectors, and deriving root positions based on the feature extraction, conditioned on the bone lengths and the bone unit vectors. The second device is further configured for receiving one or more frames as input. Every bone length is assumed to not exceed 1 meter in length. Long short term memory is used for estimating the root position to stabilize the root position. The second device is further configured for applying automatic augmentation on a global position and rotation to simulate dynamic motions. The second device is further configured for randomly changing a camera field-of-view to each batch sample to estimate arbitrary videos with different camera parameters. The second device is further configured for performing perturbation of a 2-dimensional pose with Gaussian noise and random keypoint drop on 2-dimensional pose input to simulate the noise and occlusion situation of 2-dimensional pose predictions.

BRIEF DESCRIPTION OF THE DRAWINGS

FIG. 11 shows a table of the results of Human3.6M plus the data augmentation scheme described herein, according to some embodiments.

FIG. 12 shows a table of a comparison of LSTM and 1D convolution root position estimation according to some embodiments.

DETAILED DESCRIPTION OF THE PREFERRED EMBODIMENT

Figure 1:
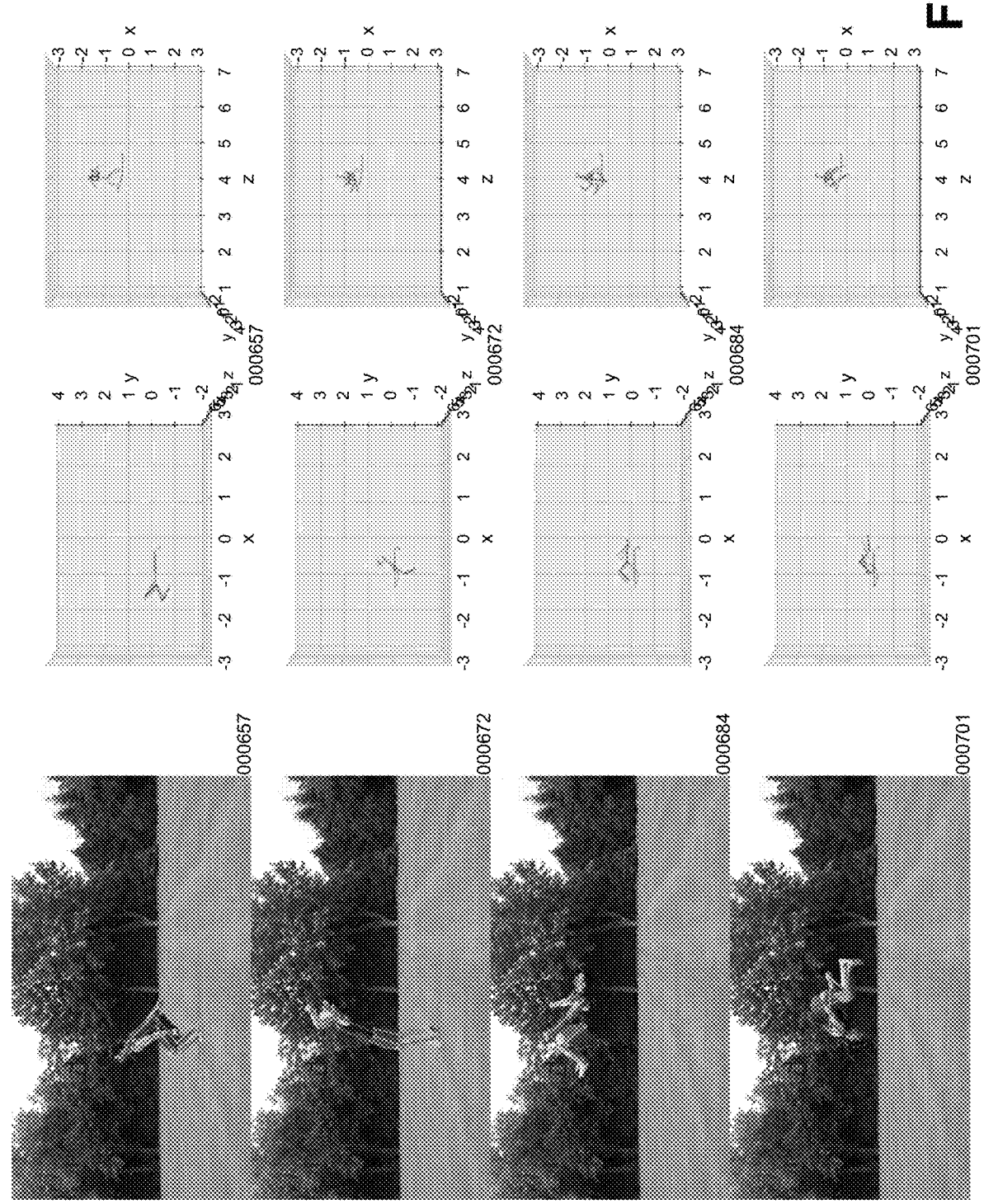
FIG. 1 illustrates a visualization of model output on videos in the wild (e.g., with uncontrolled variables/environment) according to some embodiments.

Recent progress of neural networks has shown significant progress over human pose estimation tasks. Pose estimation could be categorized into monocular 2D pose estimation, multi-view 3D pose estimation, and single view 3D pose estimation, where recently 3D pose is getting more attention to be applied to AR/VR, game and human computer interaction applications. However, current academic benchmarks on human 3D pose estimation only respect performance on their relative pose. The root positioning over time, in another word, the "trajectory" of the whole body in 3D space is not considered well enough. Applications such as motion capture, not only require precise relative pose of the body but also the root position of the whole body in 3D space. Therefore, an efficient monocular full 3D pose recovery model from 2D pose input is described herein, which is able to be applied to the above applications. Described herein are the network architecture combining temporal 1D convolution and Long Short Term Memory (LSTM) for root position estimation, how to formulate the outputs, design of loss functions and comparison with a state-of-the-art model to show effectiveness of the approach for application use. As described herein, 3D pose estimation on 15 and 17 keypoints is performed, but it could be extended to arbitrary keypoint definitions.

Monocular human 3D pose estimation has been emerging as a hot topic in the research community, since it could be applied to videos in the wild (e.g., an uncontrolled environment), which are available through the Internet as consumer generated videos. Also, enabling the pose estimation in a monocular setting could eliminate the installation of multiple cameras and aligning them in a manner so that triangulation could be solvable. Although the recent work on monocular human 3D pose estimation showed significant improvements over time, combining the global trajectory and relative pose is an extremely difficult problem due to the nature of ambiguity as multiple 3D poses are able to be mapped into the same 2D pose. Also, evaluating these methods qualitatively from video results is quite difficult and sometimes misleading in performance, since if the results are just overlaid on input image planes, the ambiguity of depth and its drifts of trajectories are not fully observable. Secondly, the methods mentioned in the Background section only evaluate their relative 3D pose, where relative pose is defined as a root bone to be in a fixed (e.g., zero) position, in which recovery of trajectory in the motion was not fully studied. Finally, Human3.6M, the major dataset used in the above human 3D pose estimation evaluation, is lacking in real world settings to cover the situation which could happen when applied to videos in the wild. The dataset has 8 cameras with almost the same camera parameters, captured in the laboratory setting within a 3×4 meters region. Therefore, additional 2D pose data is usually used in a semisupervised manner with adversarial loss.

In order to solve the above issues, which is important to apply monocular human 3D pose estimation for motion-capture purposes, the following is described: a unified human 3D relative pose and trajectory recovery network from 2D pose input combined with 1D convolution for relative pose and LSTM for trajectory. The model is efficient in terms of parameter size compared to the previous state-of-the-art methods as well as observed more stable trajectory recovery using LSTM over convolution.

The model does take multiple frames if available, but is not limited to using multiple frames by design, as in the method in VP3D. VP3D stands for VideoPose3D and is from "3D Human Pose Estimation in Video with Temporal Convolutions and Semi-Supervised Training" at https://github.com/facebookresearch/VideoPose3D. The VP3D method achieves its best performance with 243 frames of input, but the model described herein works even with 1 frame input. This is important when wanting to apply an arbitrary number of frames to be input to process. More value is placed on usability rather than making the accuracy of the relative pose for a few millimeters of difference.

In order to regress the root position and relative pose at the same time in a unified network, Kinematic Chain Space (KCS) is used for regularization purposes. Instead of using regularization, bone unit vectors and bone lengths are directly estimated, and each loss is applied separately to enforce consistency of the bone length across input frames. It is assumed that every bone length to be in the {0,1} range, in which it is assumed human bones will not exceed 1 meter in length. Additionally, tan h is applied such as an encoding/decoding scheme on the root position so that network parameters are able to be made in the same dynamic range.

Since the Human3.6M dataset is small in terms of its coverage in 3D space as well as actions, automatic augmentation is applied on the global position as well as rotation to simulate dynamic motions such as backflips or cartwheels. The camera field-of-view is randomly changed to each batch samples so that arbitrary videos are able to be estimated with different camera parameters if given camera parameters are to be conditioned to the prediction. Perturbation of the 2D pose with Gaussian noise and a random keypoint drop on 2D pose input is performed to simulate the noise and occlusion situations of 2D pose predictions. This allows using only motion capture data, where no adversarial module or loss occurs, thus preparation and training time is shorter. The Human3.6M data is merely an exemplary dataset to be used with the method and system described herein and is not meant to be limiting in any manner. Any 3D human motion-capture dataset is able to be used with the method and system described herein.

FIG. 1 illustrates a visualization of model output on videos in the wild (e.g., with uncontrolled variables/environment) according to some embodiments. In FIG. 1, column(a) shows video frames with 2D pose estimation, column (b) shows the X-Y plane 3D pose, and column (c) shows the X-Z plane 3D pose. The red line (the line generally through the person's back and head) on the 3D plot indicates global trajectory. The model is able to output trajectories with stable z-positions on dynamic motions. For a detailed definition of camera coordinates, see FIG. 5.

Figure 2:
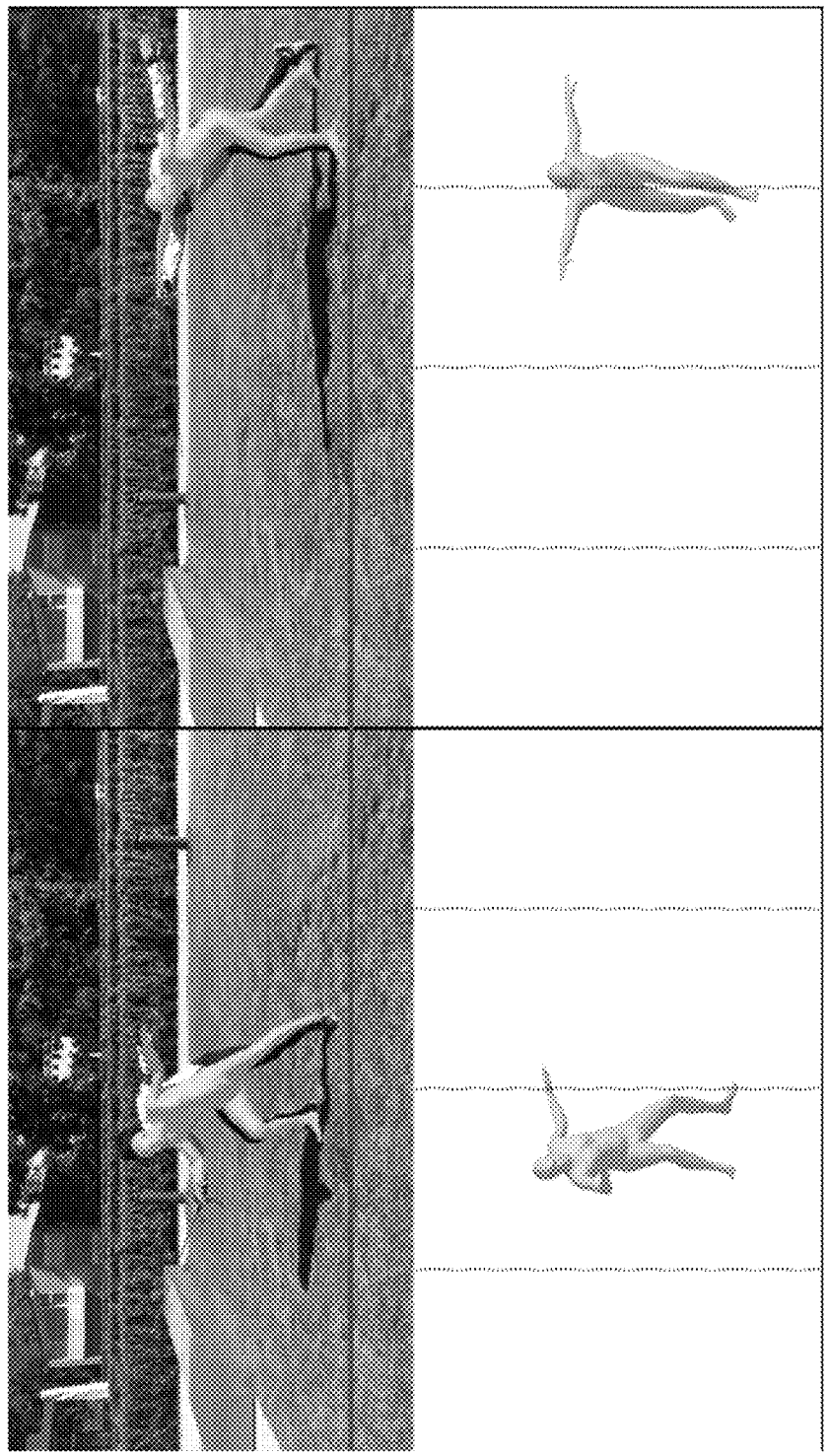
FIG. 2 shows the model described herein overcomes the depth ambiguity according to some embodiments.

The model described herein overcomes the depth ambiguity as shown in FIG. 2. The top row of FIG. 2 shows camera plane projection of human 3d pose prediction. The bottom row shows a side view of reconstruction. Even though the person is only moving parallel to the camera, the whole body especially in the depth direction is not well estimated.

Monocular human 3D pose estimation methods are able to be roughly divided into two categories: mesh-based methods and 2D lifting methods.

Mesh-Based Methods

The mesh-based approach uses prior models, such as a human mesh to recover not only poses but also skins to fit in the image plane. Specifically, the mesh-based method shows a somewhat good result if it is overlaid in the image plane, but if one looks from a different perspective, such as the side view of FIG. 2, the unstable trajectory traces are visible. This comes from the nature of the highly ambiguous problem which monocular methods suffer from. Even making the problem space to be smaller by using human prior models, the problem is yet to be solved well.

2D Lifting Methods

The other category is a monocular human 3d skeletal pose where inputs to the model are 2D pose predicted by well established human 2D pose detectors. In order to stabilize along the temporal dimension, some implementations used the LSTM sequence-to-sequence approach. However, their approach includes encoding all the frames into a fixed length. VP3D exploits temporal information by performing 1D convolutions over the time dimension. They also split the network into two, where the relative pose and trajectory estimation network are separated and jointly trained. However, the network for relative pose and trajectory uses 16M parameters each and will be 32M parameters for full pose estimation. It also uses 243 frames of input to obtain the best performance, and due to the limited camera configurations of Human3.6M, it does not work well on videos which have different camera parameters from training data.

Kinematic Chain Space

Kinematic Chain Space (KCS) is able to be used to decompose a pose into a bone vector and its length. The idea to use KCS instead of estimating a relative pose in Cartesian coordinates has been followed. The model described herein differs in terms of how to utilize the KCS in optimization. KCS has been used to map the relative pose in KCS and make an adversarial loss to be used as a regularization term to train the model in a semi-supervised way. Different from above, the method described herein directly regresses bone vectors and bone lengths, which lie in a normalized space.

Described herein are the definitions of the input and outputs, the dataset and how augmentation, network design, and loss formulation are performed.

Input

Figure 3:
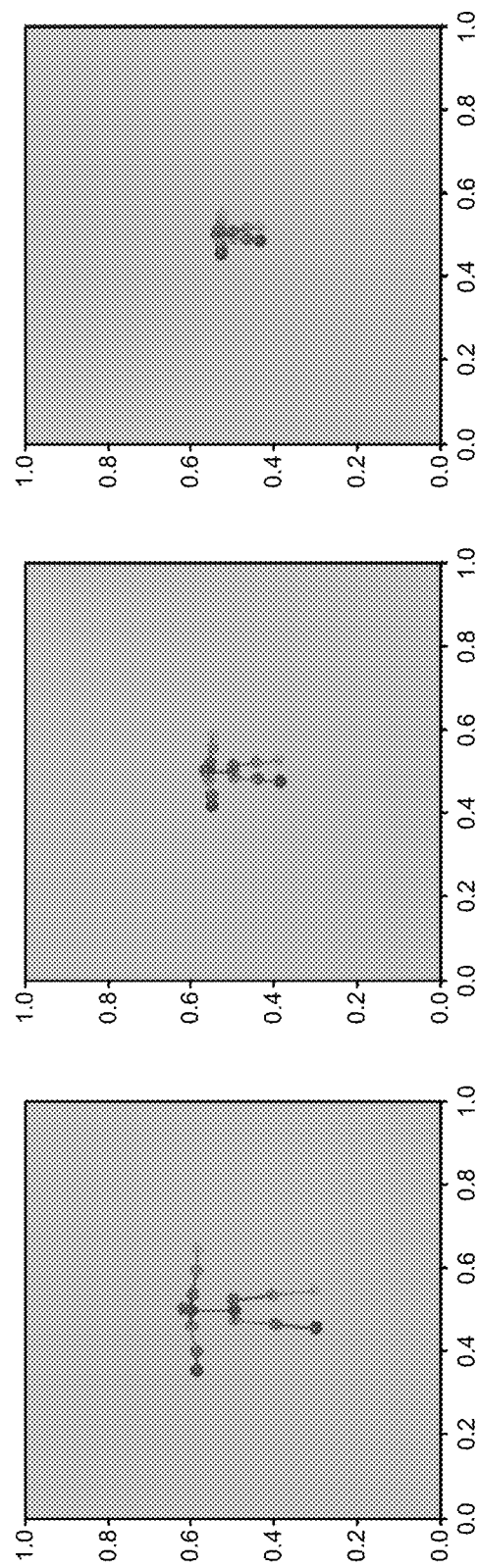
FIG. 3 shows a same 3D post reprojected to UV with different FOVs according to some embodiments.
Figure 4:
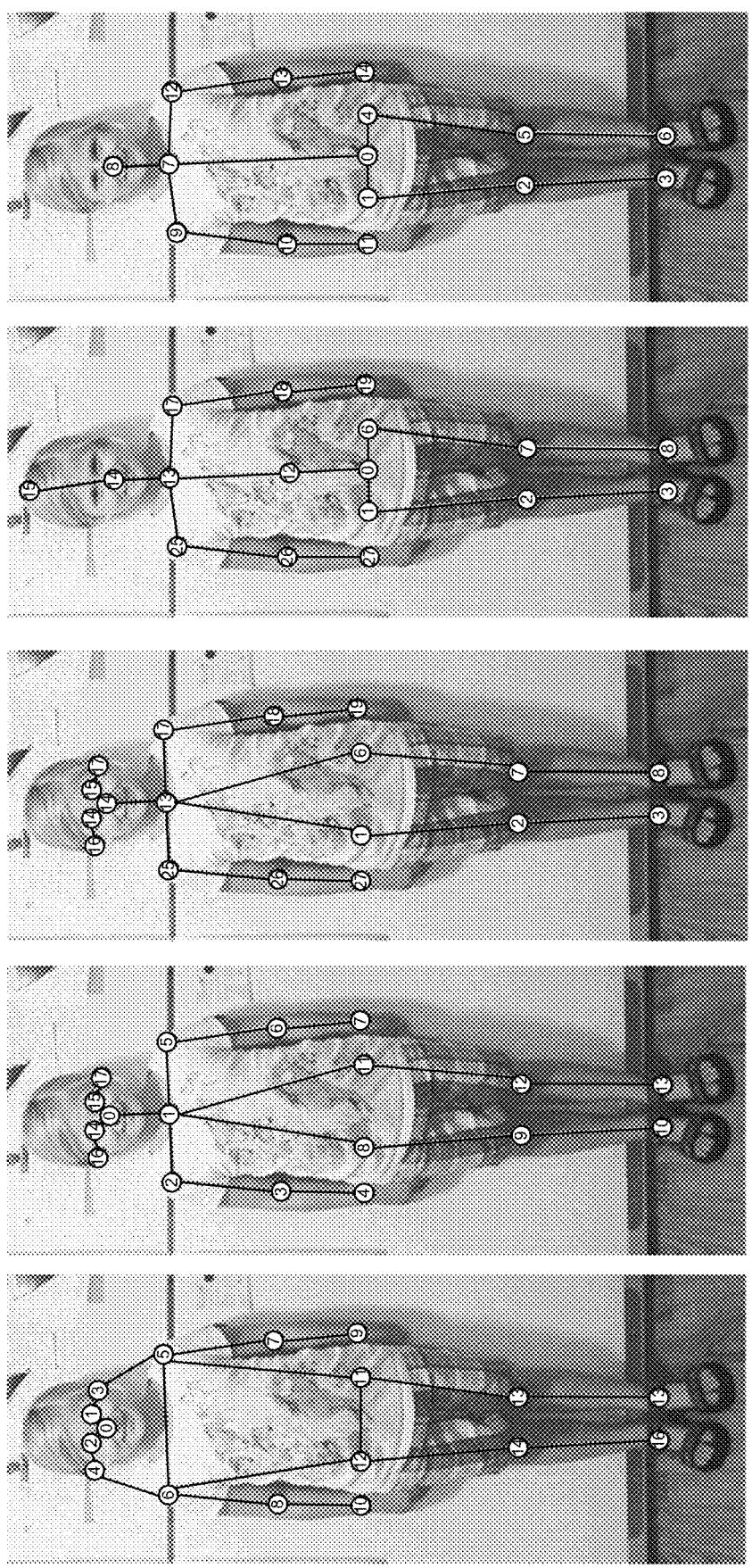
FIG. 4 shows variations in the keypoints definition according to some embodiments.

A similar scheme to 2D pose lifting methods described herein is followed, where a 2D pose is able to be estimated from arbitrary 2D pose detectors. For example, AlphaPose is able to be used. As shown in FIG. 4, 2D pose detectors output a wide variety of keypoints from 17 to 25, for example, Human3.6M uses 17 keypoints (17 movable out of 32 definitions). In order to make the model described herein work on an arbitrary 2D pose detector, 15 keypoints which intersect most have been defined and are able to use Human3.6M data (or other data) for evaluation. As input, UV normalized 2D coordinates are used, where $u \in \{0,1\}$. Also, it is often the case that 2D pose detectors fail to detect certain keypoints due to occlusion. For those, the values are set to zero. Camera focal length as input is also used. The monocular human 3D pose estimation methods use Human3.6M and Human-Eva but none of these datasets have a wide variety of camera settings, and there are attempts to apply the models to work on videos and images in the wild by applying semi-supervised training using 2D annotations. It is possible to estimate the camera parameter to calculate a reprojection error, but the camera parameter is still implicitly modeled through the pose generator network. Instead, the network described herein is modeled conditioned on 2D pose input and camera focal length. Focal length is a very important queue to support arbitrary cameras. As shown in FIG. 3, a different field-of-view (FOV) of a camera makes 2D pose appearance quite different even with the same relative pose and root position in 3D space. Without that, it is very difficult to estimate a correct pose in 3D. As described herein, it is assumed that a perspective projection camera with the principal point is at the center of the image, and the lens distortion is not considered.

FIG. 3 shows the same 3D pose reprojected to UV with different FOVs. Chart (a) is at a FOV of 60°; chart (b) is at a FOV of 90° and chart (c) is at a FOV of 120°. Camera parameters may differ in each of the clips taken in the wild.

FIG. 4 shows variations in the keypoints definition. Image (a) is MSCOCO with 17 points. Image (b) is OpenPose with 18 points. Image (c) is OpenPose with 25 points. Image (d) is Human3.6 with 17 points (17 movable out of 32). Image (e) is the method described herein with 15 points definition. The lines are standard skeletal pairs in each definition.

Output and Kinematic Chain Space

Figure 5:
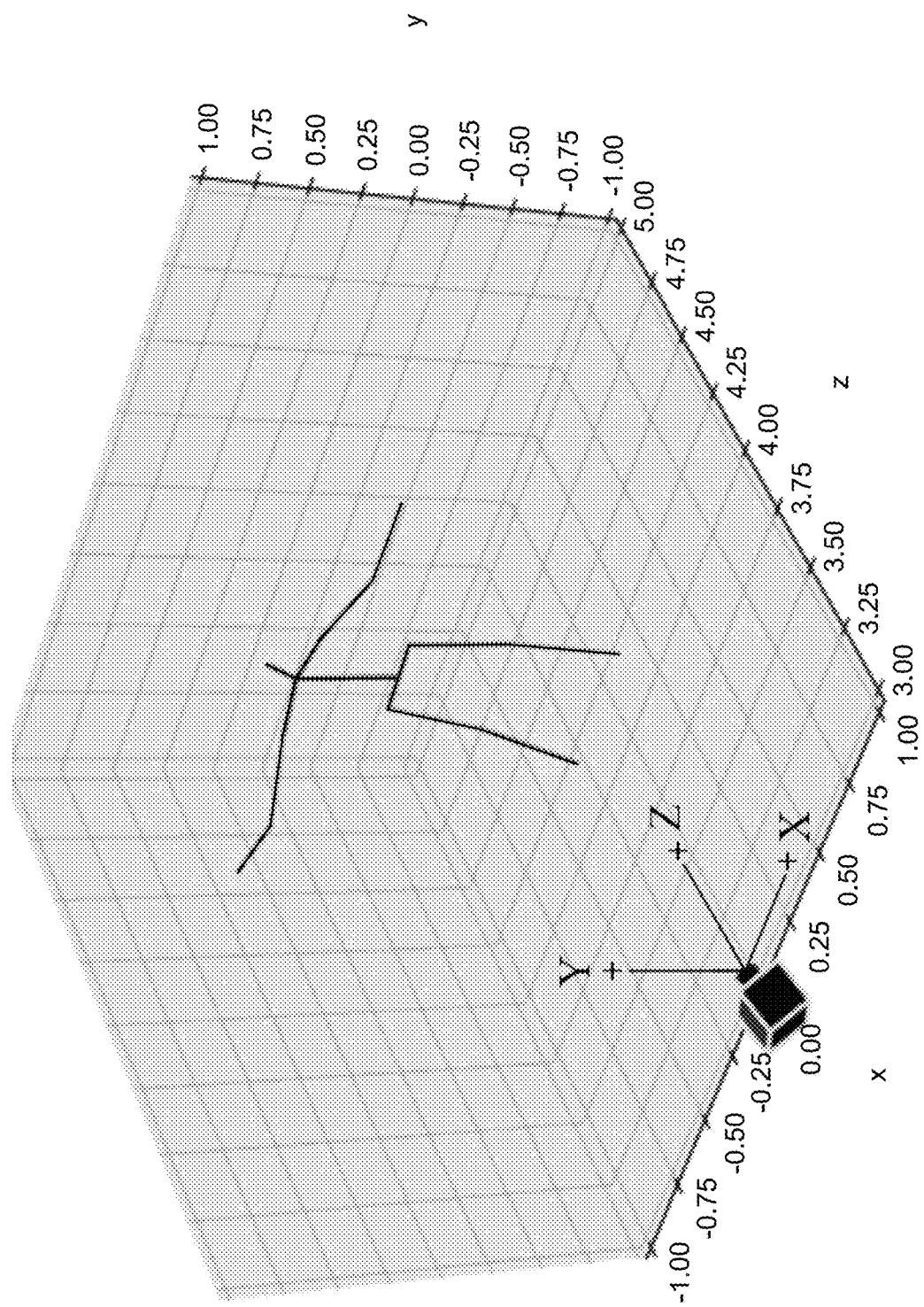
FIG. 5 shows a 3D camera coordinate of the design described herein according to some embodiments.

The network outputs are defined as a combination of root position and relative pose of the body. Root position is usually defined at the keypoint of the pelvis. Relative pose is defined as the 3D positions of other bones relative to the root position. The image (e) of FIG. 4 describes the 15 keypoints definition, where 0 is the pelvis to be used as a root position and others to be estimated as relative positions to the root. FIG. 5 describes the definition of 3D space as described herein. FIG. 5 shows a 3D camera coordinate of the design described herein according to some embodiments. FIG. 3 shows 2D projection of this pose with different FOVs. The relative pose and root position are estimated in the camera coordinates. Furthermore, KCS is utilized to decompose the relative pose into bone vectors and its lengths. The i-th joint of a kinematic chain is defined by a vector $p_i \in \mathbb{R}^3$ containing the x,y,z-coordinates of the location of this joint. By concatenating j joint vectors, a matrix representing the relative pose $P_r$ of the kinematic chain is able to be built:

$$P_r = (p_1, p_2, \ldots, p_j) \qquad (1)$$

and whole body pose P is expressed as:

$$P=(p_0, p_0, \ldots, p_r) \quad (2)$$

where $p_0$ is the root position and the relative pose is derived by subtracting the root pose. The k-th bone $b_k$ is defined as vector between the r-th and t-th joint, $$b_k = p_r - p_t = P_{rj} d_k, \quad (3)$$

where $$d = (0, \ldots, 0, 1, 0, \ldots, 0, 0, -1, \ldots, 0)^T,$$

$$D = (d_1, d_2, \ldots, d_j), \quad (4)$$

with 1 at position r and −1 at position t. d is a mapping vector for the r-th and t-th joint and by concatenating for whole joints, entire mapping matrix D is expressed as $D \in \mathbb{R}^{j \times b}$. Similar to Equation 1, a matrix $B \in \mathbb{R}^{3 \times b}$ is able to be defined as a matrix containing all b bones:

$$B = (b_1, b_2, \ldots, b_b); \quad (5)$$

where matrix B is calculated from $P_r$ by $$B = P_r D. \quad (6)$$

Analogous to D, a matrix $E \in \mathbb{R}^{b \times j}$ is able to be defined that maps B back to $P_r$:

$$P_r = BE. \quad (7)$$

Then, the network is able to learn a mapping function:

$$\left( \hat{p}_0, \|\hat{B}\|, \frac{\hat{B}}{\|\hat{B}\|} \right) \leftarrow F(u, c \mid \theta), \quad (8)$$

where 2D pose u and camera parameter c are input, and output is to estimate the root position $\hat{p}_0$, bone lengths $\|\hat{B}\|$ and its unit vectors $$\frac{\hat{B}}{\|\hat{B}\|}.$$

θ includes network parameters. The reason for not directly estimating the bone vector b is to make outputs reside in a normalized space. It is assumed that each bone length follows $\|b_k\| \in \{0,1\}$, which never exceed 1 m, in some embodiments. Any symbols with a hat are predictions, and symbols without a hat are ground truths (e.g., labels) to define the loss how far the prediction is from the truth.

Figure 6:
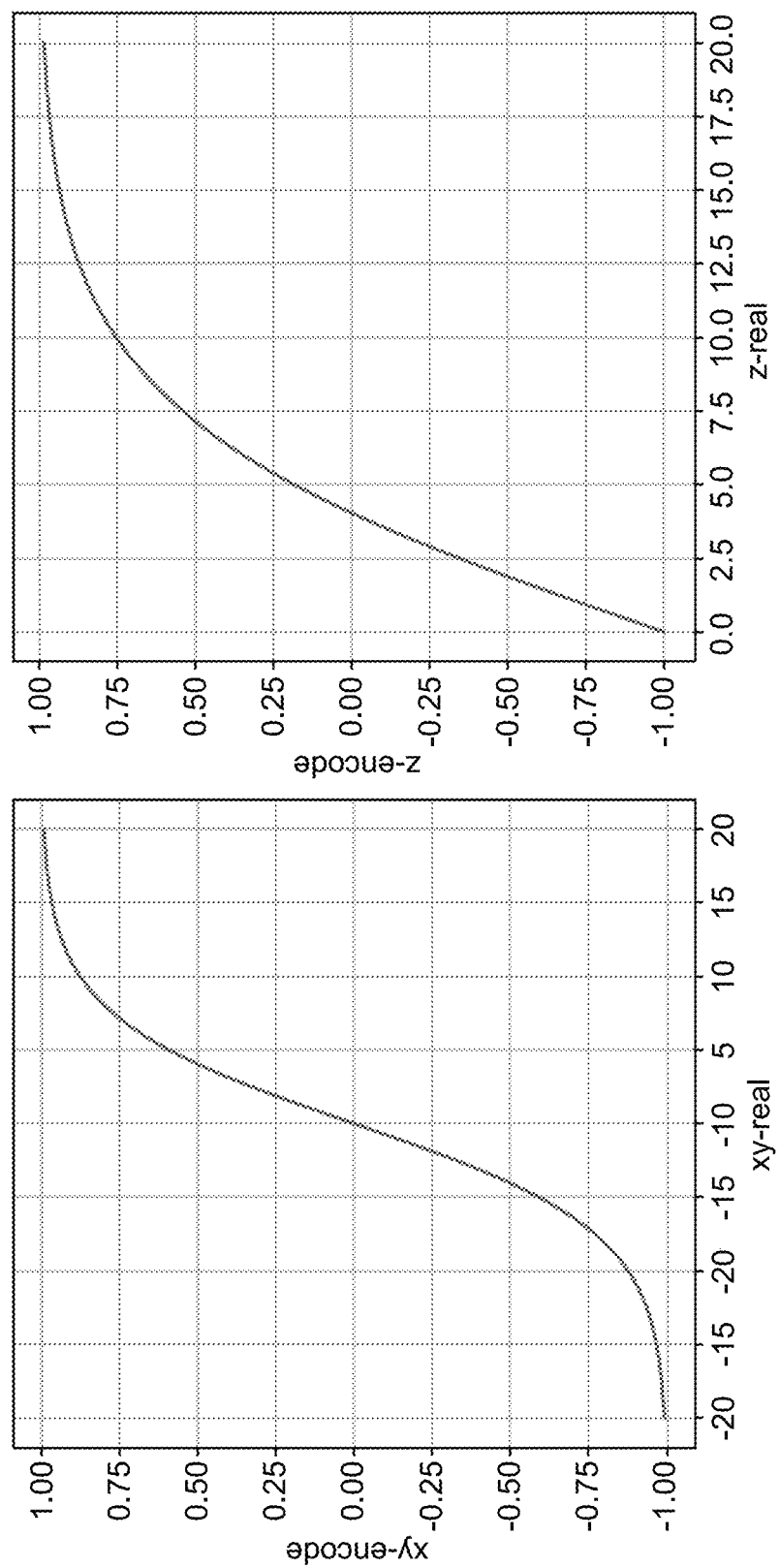
FIG. 6 shows how the values will be encoded in a normalized space according to some embodiments.

The root position, $p_0 \in \mathbb{R}^3$, is encoded and decoded in a normalized space using tan h form. It will then later be decoded into an actual value. The encoding formula is:

$$xy' = \frac{e^{\beta \varepsilon y} - 1}{e^{\beta \varepsilon y} + 1}, \quad (9)$$

$$z' = 2 \left| \frac{e^{\beta \varepsilon} - 1}{e^{\beta \varepsilon} + 1} \right| - 0.5,$$

and decoding back will be formed as:

$$xy = \left| \frac{1}{\beta} (\log(1 + x' + \varepsilon) - \log(1 - x' + \varepsilon)) \right| \quad (10)$$

$$z = \frac{1}{\beta} (\log(1 + 0.5z' + \varepsilon) - \log(-0.5z' + \varepsilon))$$

where β and ε are constant values. β=0.1 e and ε=1 e$^{-8}$ are used. FIG. 6 shows how the values will be encoded in a normalized space. FIG. 6 shows encoding and decoding the root position. It gives more granularity on the distance near the camera and saturates at 20 m. The z axis value will be non-negative.

This normalization is very important, since many pose regression models do not consider well how the output space and parameter space should be modeled. VP3D proposed to simultaneously estimate root position and relative pose with two discrete networks with weighted loss on root position, where loss on a far away root position has less weight. The method described herein includes forming the granularity in an encoded space, and makes the parameter space to be within. This is important for propagating the gradients and updating parameters not only for root position but also simultaneously for bone vectors in an end-to-end training manner.

Dataset and Augmentation

Instead of using 2D pose annotations in a semi-supervised way in which many methods adopt to generalize well on videos and images in the wild, the model described herein is trained purely from motion capture data. Human3.6M is used for initial experiments in a pure academic aspect and for commercial purposes, motion capture data provided by Sony Interactive Entertainment Inc. (SIE) is used. However, the motion capture data may be too small to cover the real world scenario. In order to solve this problem, several augmentations and perturbations are employed automatically in the training data.

Algorithm 1: Pose Augmentation
Input:
FOVs←Set of random FOVs ∈ {°40; °100}
L←Limits of position
x ∈ {−10,10}, y ∈ {−10,10}, z ∈ {0,10}
S←Camera image size limits
τ←variance threshold to make rotating motion
Output:
Augmented pose in camera coordinate: p'
2D projected pose for model input: u'
Camera parameter: c=($f_x$;$f_y$)
Data: Pose sequence data P
forall p ⊂ P do
Set random FOV, diagonal focal length:
v←Random select from FOVs
fdiag←0.5/tan(v*0.5)
Set vertical and horizontal focal length from random aspect ratio:
$f_x$,$f_y$ $F_f$($f_{diag}$, U(0.5,2.0), S)
Globally random rotate the pose along Y axis:
p'←RotateY(p−p̄, U (−π, π))
Get Max and Min Position:
p'$_{min}$, p'$_{max}$←min(p'), max(p')
Determine random camera position q in Z axis within viewing frustum using v:
$q_z$←$F_z$(p'$_{maxx}$, p'$_{minx}$, $L_z$, v)
Determine random camera position q in X axis:
$q_x$←$F_x$(p'$_{maxx}$, p'$_{minx}$, $q_z$)

Determine random camera position q in Y axis within viewing frustum using v:

$q_y \leftarrow F_y(q_z, L_z, v)$

Offset position p' with q: $p' \leftarrow p'+q$

Calculate trajectory variance: $\sigma \leftarrow p'$ if $\sigma_z < \tau$ then for each $p'_t \in p'$, rotate in Z axis linearly:

$p' \leftarrow RotateZ_T(p')$ else if $\sigma_x < \tau$ then for each $p'_t \in p'$, rotate in X axis linearly:

$p' \leftarrow RotateX_T(p')$

Project to 2D: $u' \leftarrow ProjectLinear(p',c)$

Figure 7:
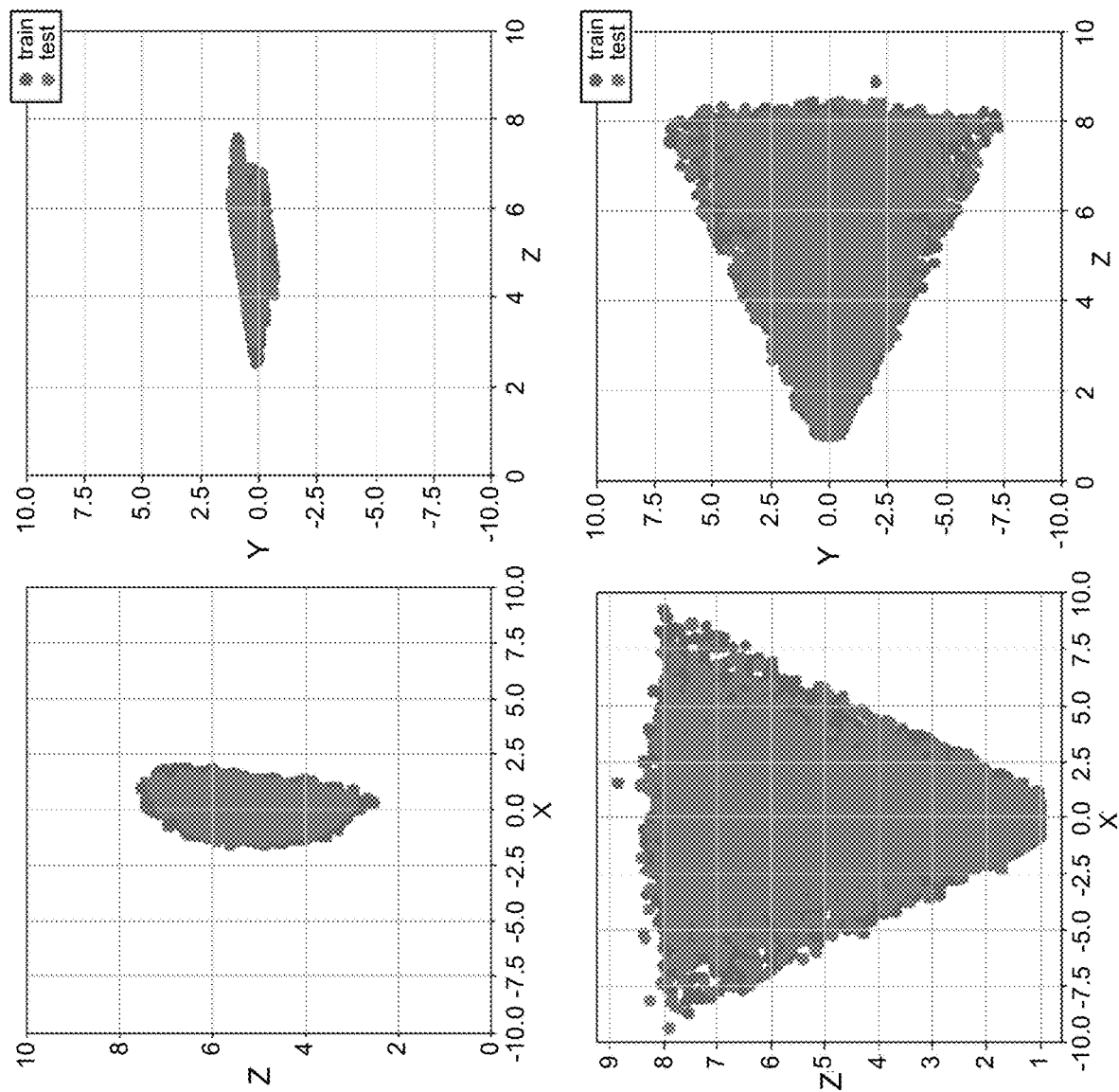
FIG. 7 shows a distribution of root position in X-Z and Z-Y plane in camera coordinate according to some embodiments.

Algorithm 1 is the simplified pseudo-code for the augmentation. Given the entire dataset P, each batch sample $p \subset P$ contains temporal frames with length of T, which is $p_t \in p$, $t=(0, 1, \ldots, T)$. The FOV is randomly picked, and the pose trajectory is fit to be within the viewport, so that there are no out-of-sight poses from the camera view. Also, by analyzing the trajectory variance, flip motion on the sequence p is randomly made to simulate a backflip or cartwheel type of motion. FIG. 7 shows root position distribution of original Human3.6M and a distribution after data augmentation as described herein, where the implementation described herein has a much broader positional distribution, making the dataset more suitable for a real world scenario.

FIG. 7 shows a distribution of root position in X-Z and Z-Y plane in camera coordinates according to some embodiments. Image (a) is the original Human3.6M, and image (b) is the augmentation described herein.

Figure 8:
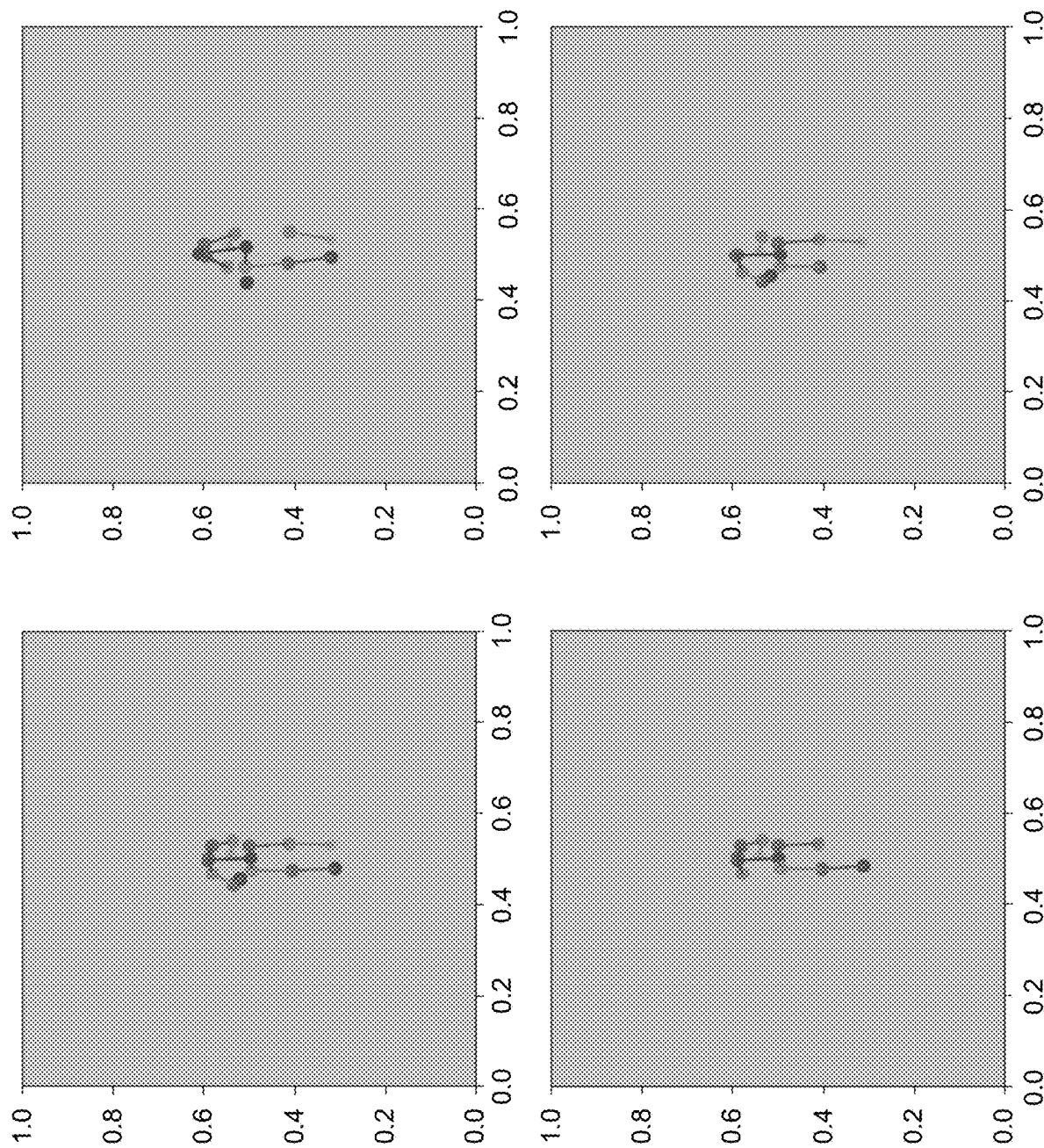
FIG. 8 shows perturbation and keypoint drops on input according to some embodiments.

Additionally, in the training phase, 2D keypoint drops and perturbations are employed to the input. During the data sampling, the 3D pose is projected into 2D using perspective projection. However, 2D pose detectors tend to have noise and miss detection due to occlusions. Methods such as VP3D and others use 2D detector results as noise-contained 2D input to train the model to be noise-proof. Instead, as described herein, the 2D projected keypoints are perturbed using Gaussian noise and randomly dropping the keypoints to simulate an occlusion scenario. Gaussian radius is adaptive, depending on the size of the body in UV space. All keypoints marked as "drop," are set to zero. FIG. 8 shows perturbation and keypoint drops on input. Chart (a) is the original clean 2D pose, and charts (b)-(d) are random drop and perturbation applied noisy 2D poses.

Network Detail

As described in Equation 8, a goal is to learn a mapping function given input 2d pose u and camera parameter c, to output the root position $\hat{p}_0$, bone length $\|B\|$ and its unit vectors $$\frac{\hat{B}}{\|\hat{B}\|}.$$

Figure 9:
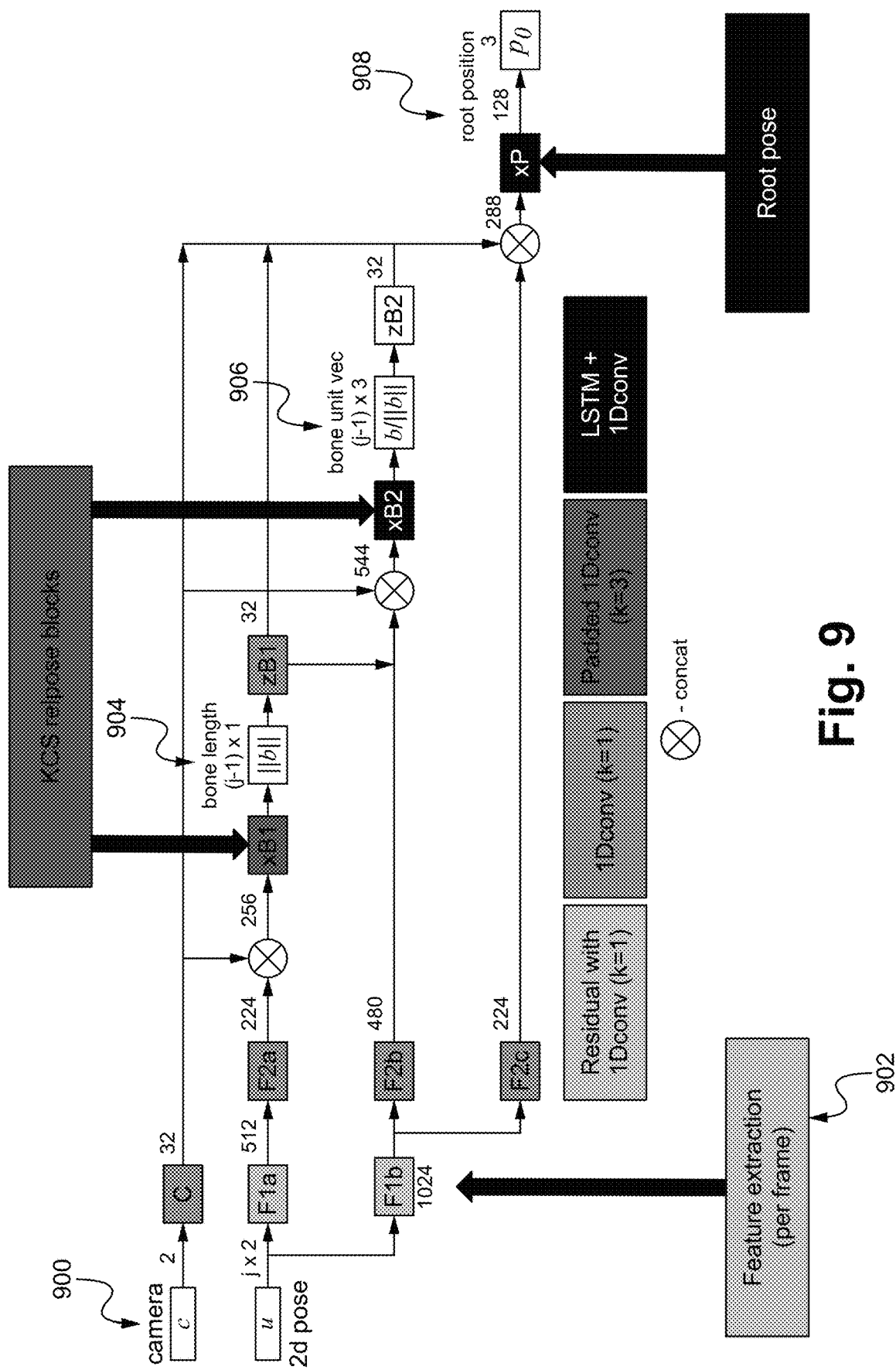
FIG. 9 shows a simplified block diagram of the network as described herein according to some embodiments.

For that, 1D convolution and LSTM are used in conjunction to achieve stable prediction of the sequence. FIG. 9 shows a simplified block diagram of the network as described herein according to some embodiments. The reason for using LSTM for root position is that 1D convolution with a kernel size of 3 was experimented with, similar to the KCS space relative pose estimation. However, it suffered on stability, especially on the z-axis, which is common problem of monocular 3D pose estimation. It is assumed that this is because no matter if a temporal loss function is applied, 1D convolution is not guaranteed to estimate the output at time t, conditioned on the previous time t−1. LSTM, however is able to pass the previous time feature into the current feature, which makes the overall root position estimation stabilized.

There are two feature extraction blocks with four stacked residual connections with 1D convolution with a kernel size of one, on input u with 512 and 1024 feature maps. The 1D convolution of kernel size 1 here includes all the temporal frames are treated in a discrete manner, thus mapping the feature space at each time frame. Then, the outputs of each block are cascaded with a 1D convolution with a kernel size of three, with edge padding on the convolution. 1D convolution with a kernel size of three is used, aggregating the adjacent frames. The edge padding applied for all convolution with a kernel size of three, makes the output number of frames to be equivalent to input frames, different from VP3D where only one frame out of N frames is output (243 frames to 1 frame output is VP3D's best model). The cascade order was designed to first predict the bone length, then conditioned on that, predict bone unit vector, then finally the root position. Each output is mapped into a feature space again with convolution with kernel size of 1, then concatenated with a feature extracted in the earlier stage to estimate the following predictions. This comes from how humans intuitively estimate the distance of the subject, by firstly estimating the overall subject size with its surrounding context. It was found that separating the first feature extraction block for bone length with bone unit vector and root position results in better accuracy. The LSTM block has two recurrent layers, with 128 hidden units and is unidirectional. In some embodiments, all activation functions use Parametric ReLU.

Loss Formulation

Loss formulation is described herein. At first, L2 loss is mostly applied to each of the outputs, formed as:

$$L_{3D} = \left\|\|\hat{B}\| - \|B\|\right\|_2 + \left\|\frac{\hat{B}}{\|\hat{B}\|} - \frac{B}{\|B\|}\right\|_2 + \|\hat{P}_y - P_r\|_2 + \|\hat{p}_0 - p_0\|_{1;smooth} + \|\hat{p}_0 - p_0\|_{1;smooth} \quad (11)$$

where B is combination of bone length $\|B\|$ and its unit vectors $$\frac{B}{\|B\|}.$$

Additionally terms are added for relative pose $P_r$ which could be derived by Eq. 7, which involves adding more weight on the bone length and vector. The $p_0$ term is for root position on both encoded space and decoded space with smooth L1 loss with x2 amplitude on the z-axis. The reason for applying smooth L1 for root position is the loss on the decoded space will be large and may affect other loss ranges by having a large error. Only applying the loss on the encoded space did not perform as well as performing the loss on both the encoded and decoded space. Additionally, temporal terms are added on bone B and root position $p_0$:

$$L_{3DT} = \|\Delta\|\hat{B}\| - \Delta\|B\|\|_2 + \left\|\Delta\frac{\hat{B}}{\|\hat{B}\|} - \Delta\frac{B}{\|B\|}\right\|_2 + \|\Delta\hat{p}_0 - \Delta p_0\|_2 \quad (12)$$

in which the first term above the Δ‖B‖ is zero, due to the fact bone lengths will not change over time. This enforces bone lengths to be consistent across a time frame. For the root position, not just delta of adjacent frames is employed, but up to a 3rd adjacent order and up to a 2nd temporal derivative. Since temporal difference is used to regularize relative motion among frames, it could be converged to a small loss even though the root position may still have offset errors. However, this is important in terms of trajectory trace, especially for the motion capture scenario. A 2D re-projection error is applied, $$L2D = \|\hat{u} - u\|_{1;smooth} \quad (13)$$

As a note, this u is not the 2D pose input after perturbation described above, but the clean 2D projection of the ground truth 3D pose. The prediction $\hat{u}$ is derived from the predicted 3D pose $\hat{P}$. Finally, the total loss will be given as below:

$$L = L_{3D} + L_{3DT} + L_{2D} \quad (14)$$

where each loss is added equally.

Experimental Evaluation

Datasets and Evaluation

Human3.6M contains 3.6 million video frames for 11 subjects, of which 7 are annotated with 3D poses. The same rules are followed as other methods, which split 5 subjects (S1, S5, S6, S7, S8) for training and 2 subjects (S9 and S11) for evaluation. Each subject performs 15 actions that are recorded using four synchronized cameras at 50 Hz. Mean per-joint position error (MPJPE) in millimeters which is the mean Euclidean distance between predicted joint positions and ground-truth joint positions is used. Although, slight changes have been made how to aggregate the MPJPE, where all actions are not averaged, treating all actions at once. For root position, the mean position error (MPE) is evaluated which is also the mean euclidean distance over the entire evaluation data. Human3.6M is evaluated with 15 keypoints and 17 keypoints definition with augmentation described herein. Perturbation is only applied to add noises and keypoint drops on the training data and to use with camera and positional augmentation for evaluation set. Differences in keypoints are described in FIG. 4.

FIG. 9 illustrates a simplified block diagram of the model described herein according to some embodiments. As noted herein, ablation model variants with no KCS combine blocks of xB1 and xB2 into one and directly estimate relative pose in Euclidean space, and no LSTM model replaces xP from LSTM to 1D convolutions.

In the step 900, camera parameters (e.g., focal length with x and y in 2D space) are fed into the network so that the network is able to output the condition of the camera. The network also receives the 2D pose. The 2D pose is able to be from any image or video.

In the step 902, feature extraction as described herein is applied per frame. Feature extraction is able to be implemented in any manner. Feature extraction includes residual determination with 1D convolution. Additionally, in some embodiments, after concatenation padded 1D convolution is implemented. In the step 904, the bone length is estimated as described herein. In the step 906, bone unit vectors are able to be estimated based on the feature extraction, conditioned on the bone lengths. In the step 908, the estimating relative poses from the bone lengths and the bone unit vectors, and deriving root positions based on the feature extraction, conditioned on the bone lengths and the bone unit vectors. In some embodiments, the camera parameters are utilized in the estimation of the root pose. LSTM is able to be utilized to help estimate the root position to stabilize the root position.

In some embodiments, fewer or additional steps are able to be implemented. In some embodiments, the order of the steps is modified.

Network Variants

Experiments have been performed on models with and without KCS, and models with and without LSTM, for root pose for ablation study. The model without KCS directly regresses the relative pose in Euclidean space using a 1D convolution block with a kernel size of three followed by a kernel size of one in the end, with the output dimension to be a number of keypoints ×3. Similarly, the model without LSTM regresses the root pose using 1D convolutions. All models are trained under the same training procedure. For comparison with other methods, the method described herein is compared against the current state-of-the-art method VP3D.

Training

For the optimizer, Adam with weight decay set to zero is used and trained for 100 epochs. Exponential decay is applied on a learning rate with a factor of 0.5 on every 10 epochs, starting at $1e^{-3}$ with a learning rate warmup for the 1st epoch. A batch size of 192 with 121 frames input is used, and frames are randomly skipped from 1 (non-skip) to 5 of 50 Hz sampled frames of Human3.6M upon batch sampling. This is to make a model robust to variations in frame rates of videos in the wild. VP3D has been retrained with the same strategy as the model described herein except that VP3D accepts only 243 frames of input, so 243 frames of input were used for VP3D instead of 121 frames. Neither having decay on batch normalization nor using Amsgrad with a decay of 0.95 as proposed in VP3D showed worse performance on all models than above training procedure.

Figure 10:
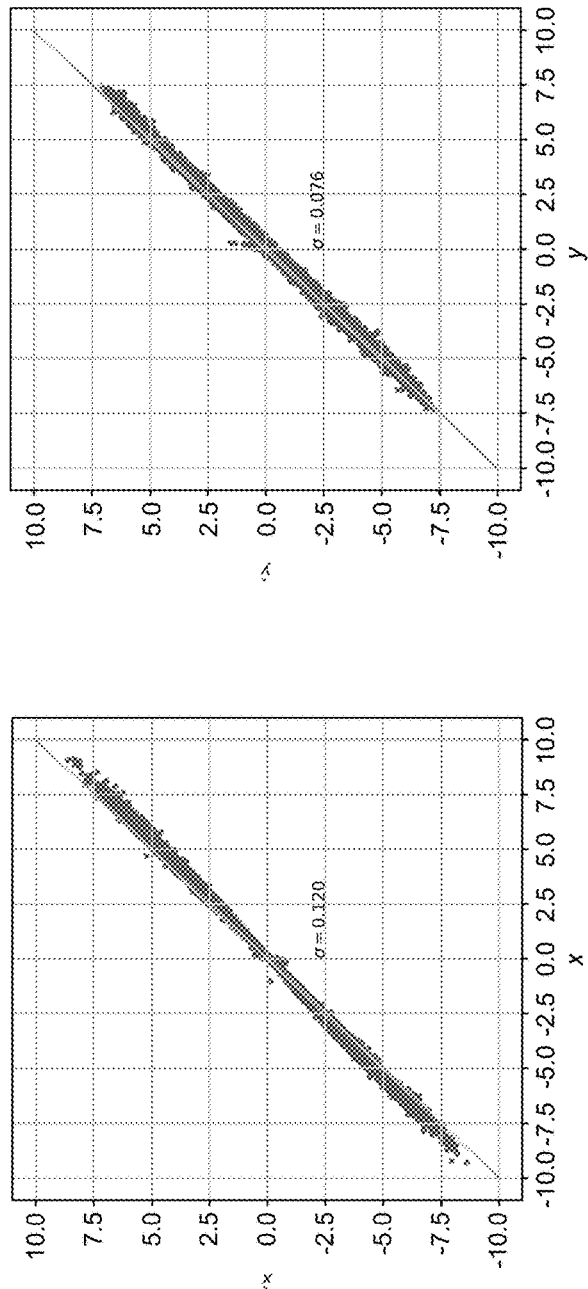
FIG. 10 shows visualization of root position prediction to the target according to some embodiments.
Figure 10:
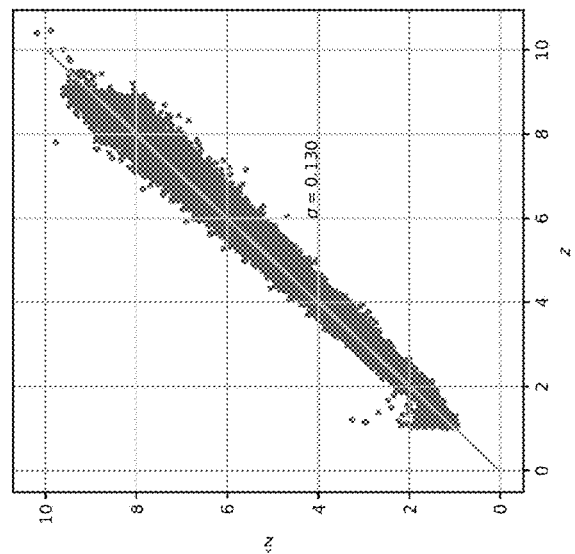

FIG. 10 shows visualization of root position prediction to the target according to some embodiments. Axis Z has a larger error compared to other axes, as well as larger errors on far distant humans.

Evaluation and Ablation study

FIG. 11 shows a table of the results of Human3.6M plus the data augmentation scheme described herein, where camera FOV varies and has a much broader distribution on root positions. Since none of the alternative methods provide root position estimation, exact comparison of the relative pose MPJPE exists. Also VP3D uses 243 frames to estimate 1 frame, while the model described herein is trained with 121 frames. Although the model described herein is able to take an arbitrary frame size, in order to make comparison under equal condition, the evaluation is performed at 243 frames input and evaluated on the middle frame (121st frame). There are two variants, one with KCS applied and one with direct relative pose estimation. The model described herein with KCS performs better than MPJPE with many fewer parameters. This indicates that it may not be possible to implicitly infer the camera parameter differences without having a queue on them. Also by looking into variants, the KCS method shows a significant advantage to direct estimation of a relative pose. It is also interesting to note, that even the root positioning block is equivalent on both methods. MPE performance showed differences. By looking into the training curve and validation errors, the current assumption is that there are still fluctuations in root positioning performance.

The MPE, root position error still seems to have a large error around 20 cm. This indicates there are still difficulties to solve uncertain depth from monocular, especially only from 2D pose input. FIG. 10 shows the overall projection error on the 15 keypoints pose model. X and Y show quite a good fit to the target, but Z shows an error as the target goes far, also showing some large error in the near distance. The near distance large error mainly comes from the whole body not being visible due to the subject being too close to the camera (e.g., the body is partially visible), but those cases would happen in a real world scenario. Although the experiment shows there are plenty of spaces to improve MPE, overall trajectory traces will be observed, which is important for the motion capture scenario.

Figure 13:
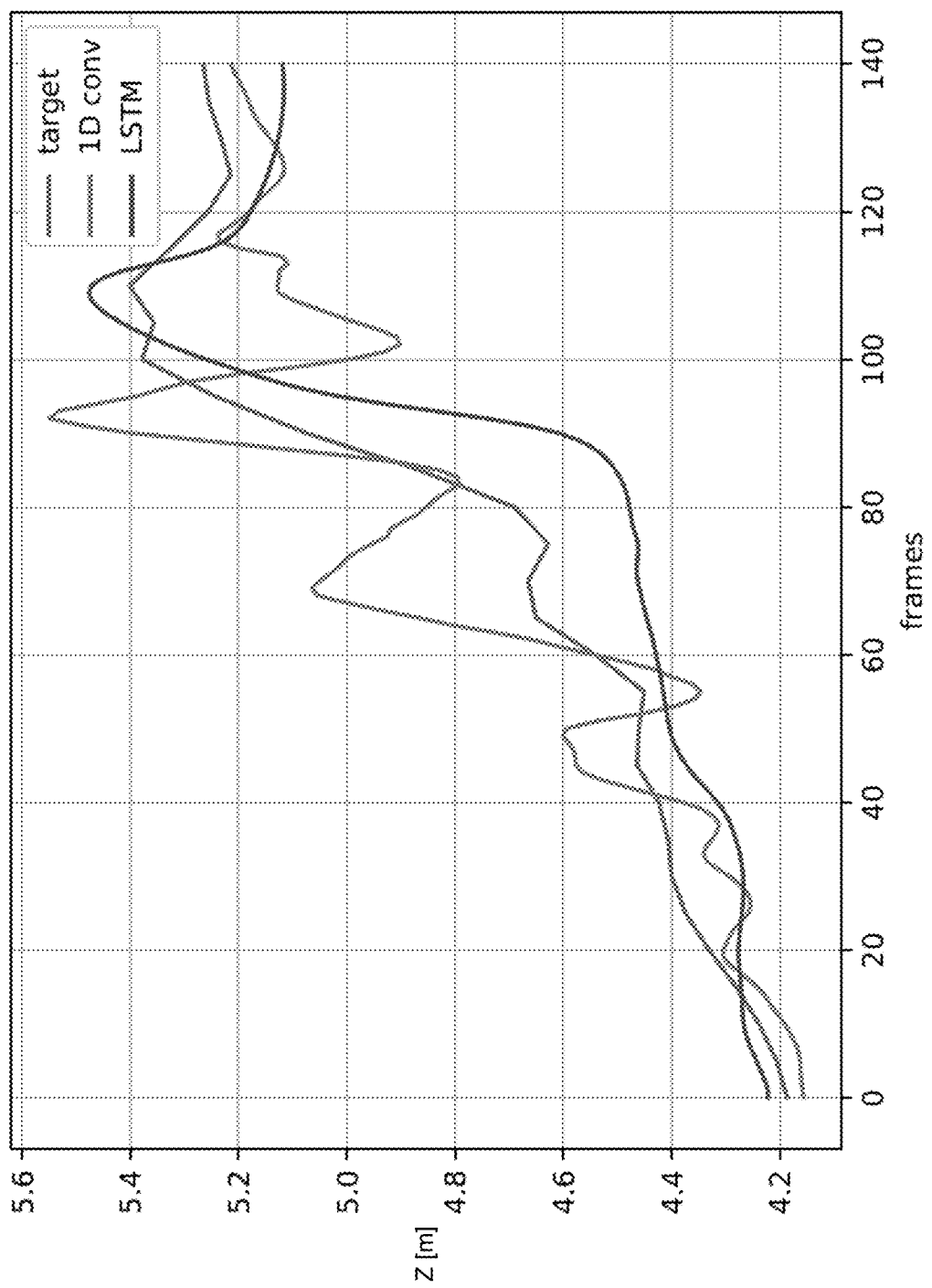
FIG. 13 shows the visualization of a Z-axis root position trace on a sample sequence to compare the model using LSTM and 1D convolution according to some embodiments.

The model with no LSTM shows comparable or better MPE to that of the LSTM model. In order to compare the motion traces, another evaluation was performed, where all output frames are used instead of taking one middle frame of input, which was to align with VP3D. With this, looking into mean trajectory error defined as the second term of Equation 12, the LSTM version shows better trajectory performance, as shown in FIG. 12. The difference may become more significant when trying to down-size the model parameters. FIG. 13 shows a backflip sequence applied to the compact version of the model described herein with LSTM versus 1D convolution for root pose estimation. 1D convolution estimates huge drifts especially on the Z-axis, which is important for motion recovery. FIG. 13 shows the visualization of a Z-axis root position trace on a sample sequence to compare the model using LSTM and 1D convolution. 1D convolution tends to have huge trace errors especially on dynamic motion.

Figure 14A:
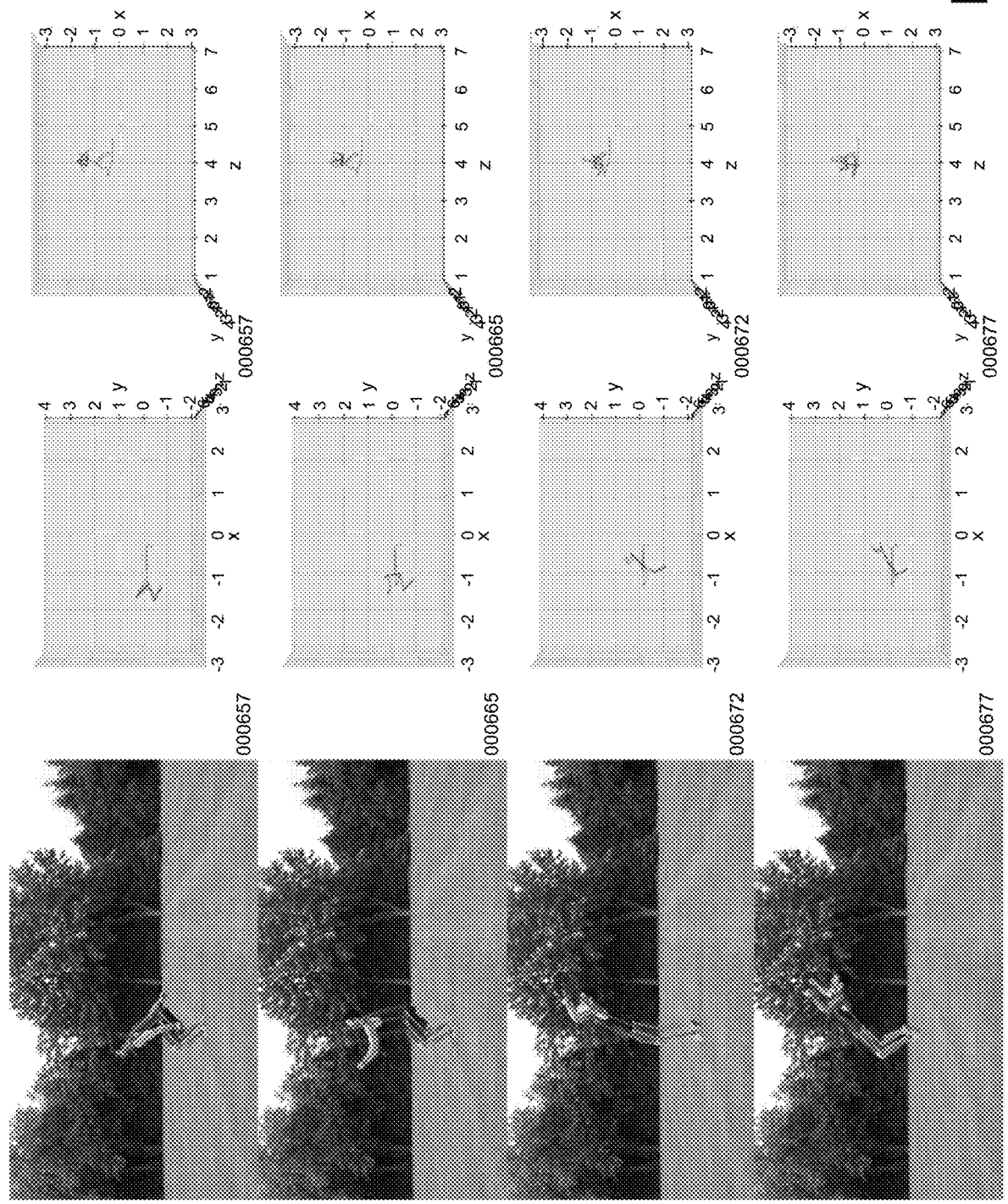
FIGS. 14A-B shows a backflip video from YouTube and applied AlphaPose as the 2D pose detector, then performed using the method described herein according to some embodiments.
Figure 14B:
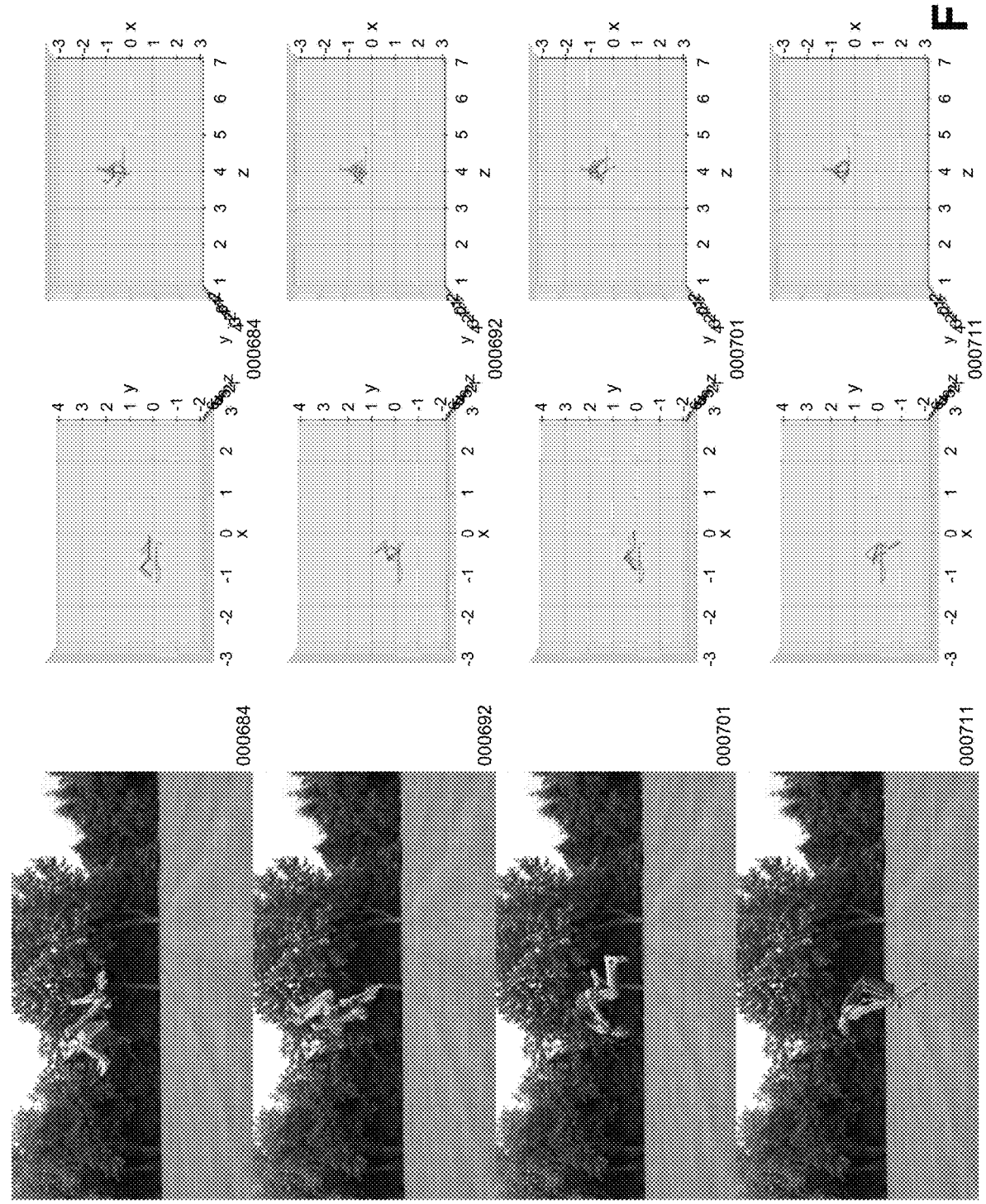

FIGS. 14A-B show backflip video from YouTube and applied AlphaPose as the 2D pose detector, then performed using the method described herein. As it shows on the X-Z plane reprojection, overall root position on Z-axis is quite stable, despite the fact the motion itself is quite dynamic and has many occlusion and errors on 2D pose detectors. FIGS. 14A-B show visualization of the output of the model described herein on videos in the wild, placed in 2 grouped columns in which each group shows 4 frames. From the left, the video frame with 2D pose estimation, X-Y plane 3D pose, X-Z plane 3D pose. The red line on the 3D plot indicates global trajectory. The model described herein is able to output trajectories with stable z-positions on dynamic motions. The 6th frame above has a large error on the 2D pose detection result.

Conclusion

The method described herein enables full skeletal 3D pose recovery from a monocular camera, where full skeletal includes both root position and a relative pose in 3D. The model observed a significant advantage against the current state-of-the-art in academia, to cover various FOV, and dynamic motions such as a backflip trained with only motion capture data. Making the model based on human perception instead of brutally modeling the large network and regressing the value, the utilization described herein of KCS and forming the model in normalized space yields a better performance.

The method described herein only takes a 2D pose input normalized in UV space and a basic camera parameter as input. Bone length estimation is trained with a very small distribution, and it is very difficult to estimate the true bone length without support of other queues, such as an RGB image (e.g., appearance feature). It was hypothesized that bone length could be derived from the proportion of 2D bone length, where a child tends to have longer trunk compared with arm bones. It is possible to roughly estimate the height of the person based on the context of surroundings. A game engine (such as Unreal Engine) is able to be utilized to render images with associated 3D geometries and perform end-to-end estimation of human 3D pose from image. An original adversarial module has been built which enables to do semi-supervised training with 2D annotation.

Figure 15:
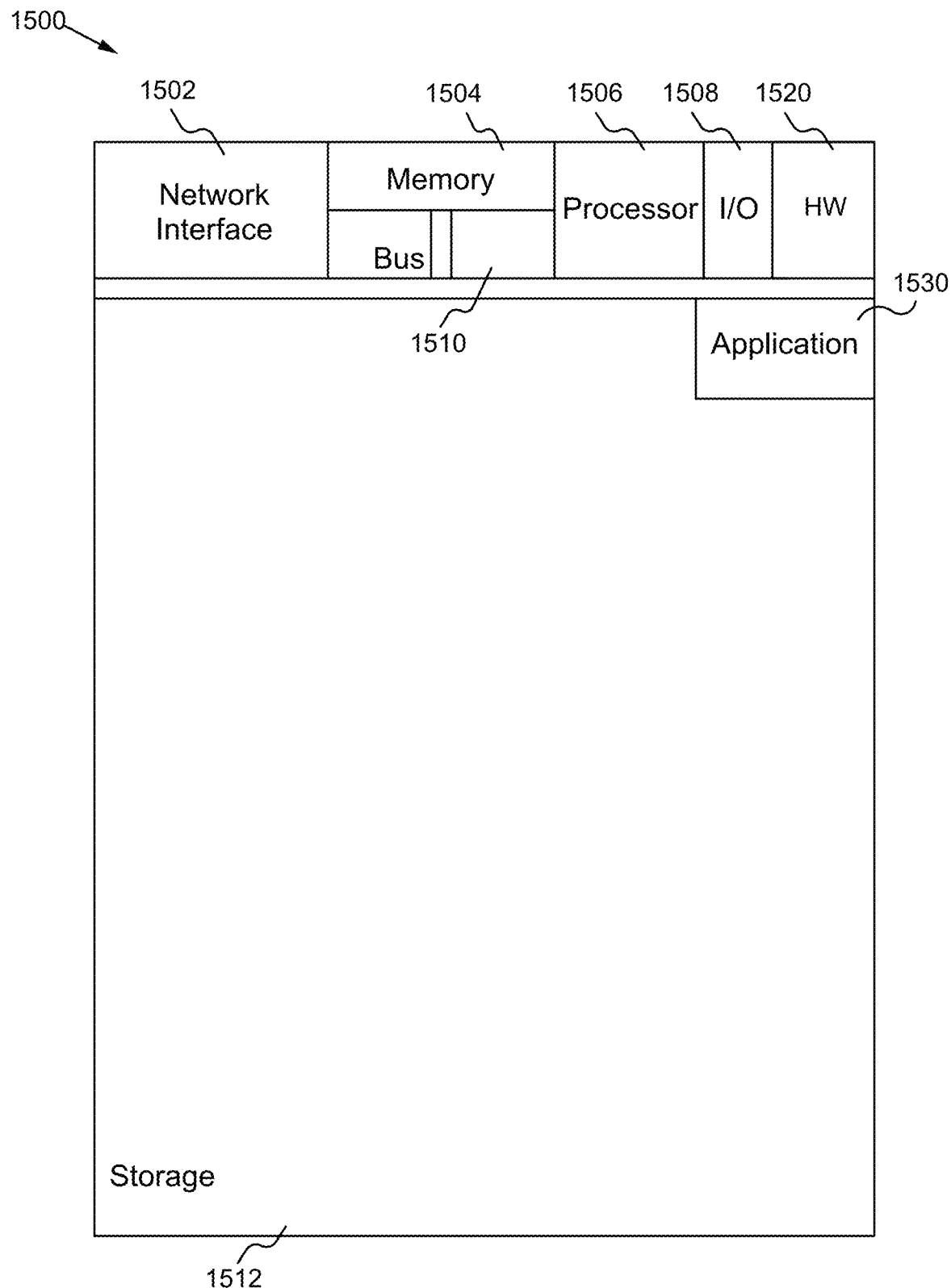
FIG. 15 shows a block diagram of an exemplary computing device configured to implement the full skeletal 3D pose recovery method according to some embodiments.

FIG. 15 shows a block diagram of an exemplary computing device configured to implement the full skeletal 3D pose recovery method according to some embodiments. The computing device 1500 is able to be used to acquire, store, compute, process, communicate and/or display information such as images and videos. The computing device 1500 is able to implement any of the full skeletal 3D pose recovery aspects. In general, a hardware structure suitable for implementing the computing device 1500 includes a network interface 1502, a memory 1504, a processor 1506, I/O device(s) 1508, a bus 1510 and a storage device 1512. The choice of processor is not critical as long as a suitable processor with sufficient speed is chosen. The memory 1504 is able to be any conventional computer memory known in the art. The storage device 1512 is able to include a hard drive, CDROM, CDRW, DVD, DVDRW, High Definition disc/drive, ultra-HD drive, flash memory card or any other storage device. The computing device 1500 is able to include one or more network interfaces 1502. An example of a network interface includes a network card connected to an Ethernet or other type of LAN. The I/O device(s) 1508 are able to include one or more of the following: keyboard, mouse, monitor, screen, printer, modem, touchscreen, button interface and other devices. Full skeletal 3D pose recovery application(s) 1530 used to implement the full skeletal 3D pose recovery method are likely to be stored in the storage device 1512 and memory 1504 and processed as applications are typically processed. More or fewer components shown in FIG. 15 are able to be included in the computing device 1500. In some embodiments, full skeletal 3D pose recovery hardware 1520 is included. Although the computing device 1500 in FIG. 15 includes applications 1530 and hardware 1520 for the full skeletal 3D pose recovery method, the full skeletal 3D pose recovery method is able to be implemented on a computing device in hardware, firmware, software or any combination thereof. For example, in some embodiments, the full skeletal 3D pose recovery applications 1530 are programmed in a memory and executed using a processor. In another example, in some embodiments, the full skeletal 3D pose recovery hardware 1520 is programmed hardware logic including gates specifically designed to implement the full skeletal 3D pose recovery method.

In some embodiments, the full skeletal 3D pose recovery application(s) 1530 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the full skeletal 3D pose recovery method described herein, devices such as digital cameras/camcorders are used to acquire content. The full skeletal 3D pose recovery method is able to be implemented with user assistance or automatically without user involvement to perform pose estimation.

In operation, the full skeletal 3D pose recovery method provides a more accurate and efficient post estimation implementation. The results show that much better pose estimation occurs compared with the previous implementations.

Some Embodiments of Full Skeletal 3D Pose Recovery From Monocular Camera

1. A method comprising:
   receiving camera information, wherein the camera information includes a 2-dimensional pose and camera parameters including a focal length;
   applying feature extraction on the camera information, including residual determination with 1-dimensional convolution;
   estimating bone lengths based on the feature extraction;
   estimating bone unit vectors based on the feature extraction, conditioned on the bone lengths; and
   estimating relative poses from the bone lengths and the bone unit vectors, and deriving root positions based on the feature extraction, conditioned on the bone lengths and the bone unit vectors.
2. The method of clause 1 further comprising receiving one or more frames as input.
3. The method of clause 1 wherein every bone length is assumed to not exceed 1 meter in length.
4. The method of clause 1 wherein long short term memory is used for estimating the root position to stabilize the root position.
5. The method of clause 1 further comprising applying automatic augmentation on a global position and rotation to simulate dynamic motions.
6. The method of clause 1 further comprising randomly changing a camera field-of-view to each batch sample to estimate arbitrary videos with different camera parameters.
7. The method of clause 1 further comprising performing perturbation of a 2-dimensional pose with Gaussian noise and random keypoint drop on 2-dimensional pose input to simulate the noise and occlusion situation of 2-dimensional pose predictions.
8. An apparatus comprising:
   a non-transitory memory for storing an application, the application for:
      receiving camera information, wherein the camera information includes a 2-dimensional pose and camera parameters including a focal length;
      applying feature extraction on the camera information, including residual determination with 1-dimensional convolution;
      estimating bone lengths based on the feature extraction;
      estimating bone unit vectors based on the feature extraction, conditioned on the bone lengths; and
      estimating relative poses from the bone lengths and the bone unit vectors, and deriving root positions based on the feature extraction, conditioned on the bone lengths and the bone unit vectors; and
   a processor coupled to the memory, the processor configured for processing the application.
9. The apparatus of clause 8 further comprising receiving one or more frames as input.
10. The apparatus of clause 8 wherein every bone length is assumed to not exceed 1 meter in length.
11. The apparatus of clause 8 wherein long short term memory is used for estimating the root position to stabilize the root position.
12. The apparatus of clause 8 further comprising applying automatic augmentation on a global position and rotation to simulate dynamic motions.
13. The apparatus of clause 8 further comprising randomly changing a camera field-of-view to each batch sample to estimate arbitrary videos with different camera parameters.
14. The apparatus of clause 8 further comprising performing perturbation of a 2-dimensional pose with Gaussian noise and random keypoint drop on 2-dimensional pose input to simulate the noise and occlusion situation of 2-dimensional pose predictions.
15. A system comprising:
    a camera configured for acquiring content; and
    a computing device configured for:
       receiving camera information from the camera, wherein the camera information includes a 2-dimensional pose and camera parameters including a focal length;
       applying feature extraction on the camera information, including residual determination with 1-dimensional convolution;
       estimating bone lengths based on the feature extraction;
       estimating bone unit vectors based on the feature extraction, conditioned on the bone lengths; and
       estimating relative poses from the bone lengths and the bone unit vectors, and deriving root positions based on the feature extraction, conditioned on the bone lengths and the bone unit vectors.
16. The system of clause 15 further comprising receiving one or more frames as input.
17. The system of clause 15 wherein every bone length is assumed to not exceed 1 meter in length.
18. The system of clause 15 wherein long short term memory is used for estimating the root position to stabilize the root position.
19. The system of clause 15 further comprising applying automatic augmentation on a global position and rotation to simulate dynamic motions.
20. The system of clause 15 further comprising randomly changing a camera field-of-view to each batch sample to estimate arbitrary videos with different camera parameters.
21. The system of clause 15 further comprising performing perturbation of a 2-dimensional pose with Gaussian noise and random keypoint drop on 2-dimensional pose input to simulate the noise and occlusion situation of 2-dimensional pose predictions.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method comprising:
   receiving camera information, wherein the camera information includes a 2-dimensional pose and camera parameters including a focal length;

applying feature extraction on the camera information, including residual determination with 1-dimensional convolution;

estimating bone lengths based on the feature extraction;

estimating bone unit vectors based on the feature extraction, conditioned on the bone lengths; and estimating relative poses from the bone lengths and the bone unit vectors, and deriving root positions based on the feature extraction, conditioned on the bone lengths and the bone unit vectors.

2. The method of claim 1 further comprising receiving one or more frames as input.

3. The method of claim 1 wherein every bone length is assumed to not exceed 1 meter in length.

4. The method of claim 1 wherein long short term memory is used for estimating the root position to stabilize the root position.

5. The method of claim 1 further comprising applying automatic augmentation on a global position and rotation to simulate dynamic motions.

6. The method of claim 1 further comprising randomly changing a camera field-of-view to each batch sample to estimate arbitrary videos with different camera parameters.

7. The method of claim 1 further comprising performing perturbation of a 2-dimensional pose with Gaussian noise and random keypoint drop on 2-dimensional pose input to simulate the noise and occlusion situation of 2-dimensional pose predictions.

8. An apparatus comprising:
a non-transitory memory for storing an application, the application for:
receiving camera information, wherein the camera information includes a 2-dimensional pose and camera parameters including a focal length;
applying feature extraction on the camera information, including residual determination with 1-dimensional convolution;
estimating bone lengths based on the feature extraction;
estimating bone unit vectors based on the feature extraction, conditioned on the bone lengths; and
estimating relative poses from the bone lengths and the bone unit vectors, and deriving root positions based on the feature extraction, conditioned on the bone lengths and the bone unit vectors; and
a processor coupled to the memory, the processor configured for processing the application.

9. The apparatus of claim 8 further comprising receiving one or more frames as input.

10. The apparatus of claim 8 wherein every bone length is assumed to not exceed 1 meter in length.

11. The apparatus of claim 8 wherein long short term memory is used for estimating the root position to stabilize the root position.

12. The apparatus of claim 8 further comprising applying automatic augmentation on a global position and rotation to simulate dynamic motions.

13. The apparatus of claim 8 further comprising randomly changing a camera field-of-view to each batch sample to estimate arbitrary videos with different camera parameters.

14. The apparatus of claim 8 further comprising performing perturbation of a 2-dimensional pose with Gaussian noise and random keypoint drop on 2-dimensional pose input to simulate the noise and occlusion situation of 2-dimensional pose predictions.

15. A system comprising:
a camera configured for acquiring content; and
a computing device configured for:
receiving camera information from the camera, wherein the camera information includes a 2-dimensional pose and camera parameters including a focal length;
applying feature extraction on the camera information, including residual determination with 1-dimensional convolution;
estimating bone lengths based on the feature extraction;
estimating bone unit vectors based on the feature extraction, conditioned on the bone lengths; and
estimating relative poses from the bone lengths and the bone unit vectors, and deriving root positions based on the feature extraction, conditioned on the bone lengths and the bone unit vectors.

16. The system of claim 15 further comprising receiving one or more frames as input.

17. The system of claim 15 wherein every bone length is assumed to not exceed 1 meter in length.

18. The system of claim 15 wherein long short term memory is used for estimating the root position to stabilize the root position.

19. The system of claim 15 further comprising applying automatic augmentation on a global position and rotation to simulate dynamic motions.

20. The system of claim 15 further comprising randomly changing a camera field-of-view to each batch sample to estimate arbitrary videos with different camera parameters.

21. The system of claim 15 further comprising performing perturbation of a 2-dimensional pose with Gaussian noise and random keypoint drop on 2-dimensional pose input to simulate the noise and occlusion situation of 2-dimensional pose predictions.

* * * * *